(12) United States Patent
Tashiro (10) Patent No.: US 12,080,326 B2
(45) Date of Patent: Sep. 3, 2024

(54) MAGNETIC DISK DEVICE AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Tomonari Tashiro, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/181,859

(22) Filed: Mar. 10, 2023

(65) Prior Publication Data
US 2024/0096352 A1    Mar. 21, 2024

(30) Foreign Application Priority Data
Sep. 21, 2022 (JP) ................................. 2022-150091

(51) Int. Cl.
*G11B 5/40* (2006.01)
(52) U.S. Cl.
CPC ..................................... *G11B 5/40* (2013.01)
(58) Field of Classification Search
None
See application file for complete search history.

(56) References Cited

U.S. PATENT DOCUMENTS

| 5,557,183 A | 9/1996 | Bates et al. |
| 6,600,614 B2 | 7/2003 | Lenny et al. |
| 7,291,994 B2 | 11/2007 | Assar et al. |
| 7,707,461 B2 | 4/2010 | Dougherty et al. |
| 8,804,267 B2 | 8/2014 | Huang et al. |
| 8,963,452 B2 * | 2/2015 | Otaguro ................. G11B 19/28 318/3 |
| 9,484,733 B1 * | 11/2016 | Ferris ........................ H02H 5/04 |
| 2007/0195446 A1 * | 8/2007 | Yun .......................... G11B 5/09 360/68 |
| 2008/0024894 A1 | 1/2008 | Yamazaki |
| 2011/0102931 A1 * | 5/2011 | Kuroiwa .................. G11B 5/54 |

(Continued)

FOREIGN PATENT DOCUMENTS

JP     2021-118604     8/2021

*Primary Examiner* — William J Klimowicz
(74) *Attorney, Agent, or Firm* — Knobbe, Martens, Olson & Bear, LLP (57) ABSTRACT

According to an embodiment, a magnetic disk device includes a first component and a second component. The first component operates at a voltage of a first value. The second component is connected to the first component by a power line for transmitting power to the first component, and operates at a voltage of a second value. In response to supply of the voltage of the second value, the second component outputs a voltage of a third value smaller than the first value to the power line and measures a fourth value, which is a value of current flowing through the power line. The second component starts output of the voltage of the first value to the power line when the fourth value is smaller than the first threshold, and stops output of the voltage to the power line when the fourth value is larger than the first threshold.

16 Claims, 6 Drawing Sheets

(56) References Cited

U.S. PATENT DOCUMENTS

| | | | | |
|---|---|---|---|---|
| 2011/0149425 | A1* | 6/2011 | Hatagami | H02J 1/10 |
| 2012/0169349 | A1* | 7/2012 | Hu | G11B 27/36 |
| | | | | 324/537 |
| 2016/0203838 | A1* | 7/2016 | Chen | G11B 19/2081 |
| | | | | 360/75 |
| 2021/0240243 | A1* | 8/2021 | Bimberg | G06F 1/266 |
| 2021/0294669 | A1* | 9/2021 | Bimberg | G06F 9/5016 |

\* cited by examiner

MAGNETIC DISK DEVICE AND METHOD

CROSS-REFERENCE TO RELATED APPLICATIONS

This application is based upon and claims the benefit of priority from Japanese Patent Application No. 2022-150091, filed on Sep. 21, 2022; the entire contents of which are incorporated herein by reference.

FIELD

An embodiment described herein relates generally to a magnetic disk device and a method.

BACKGROUND

A component group mounted on a magnetic disk device includes a component such as an integrated circuit near which peripheral elements are provided. The peripheral elements are, for example, bypass capacitors.

DETAILED DESCRIPTION

According to a present embodiment, a magnetic disk device includes a magnetic disk, a magnetic head, and a component group that writes and reads data to and from the magnetic disk by using the magnetic head. The component group includes a first component and a second component. The first component operates at a voltage of a first value. The second component is connected to the first component by a power line for transmitting power to the first component, and operates at a voltage of a second value. When supply of the voltage of the second value to the second component is started, the second component outputs a voltage of a third value smaller than the first value to the power line. The second component measures a fourth value, which is a value of current flowing through the power line in accordance with output of the voltage of the third value. When the fourth value is smaller than a first threshold, the second component starts output of the voltage of the first value to the power line. When the fourth value is larger than the first threshold, the second component stops the output of the voltage to the power line.

A magnetic disk device and a method according to the embodiment will be described in detail below with reference to the accompanying drawings. Note that the present invention is not limited by the embodiment.

EMBODIMENT

Figure 1:
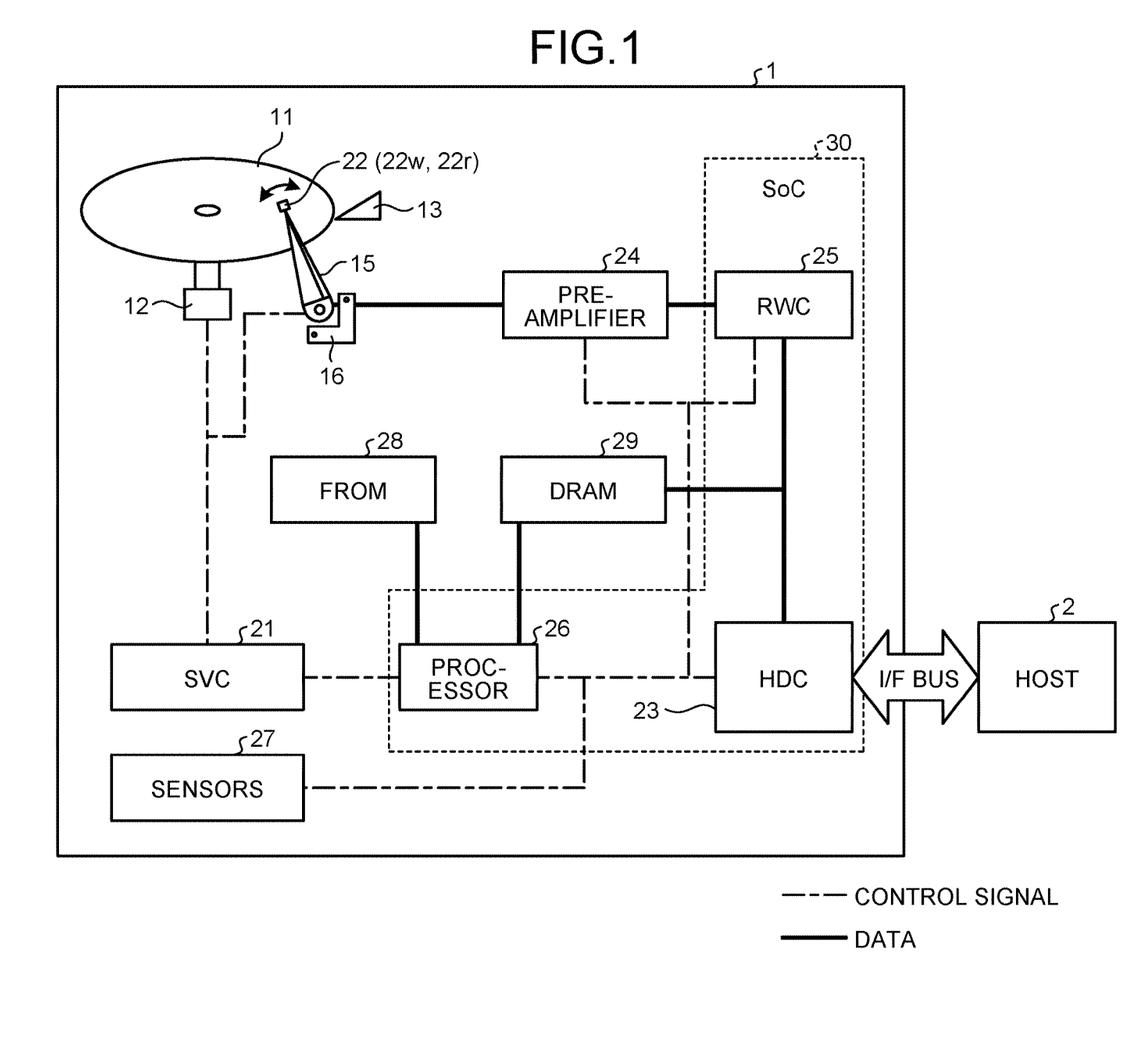
FIG. 1 is a schematic diagram illustrating one example of a configuration of a magnetic disk device of an embodiment.

FIG. 1 is a schematic diagram illustrating one example of a configuration of a magnetic disk device 1 according to the embodiment.

The magnetic disk device 1 is configured to be connected to a host 2. The magnetic disk device 1 can receive an access command such as a write command and a read command from the host 2.

The magnetic disk device 1 includes a magnetic disk 11. A magnetic layer is formed on the surface of the magnetic disk 11 The magnetic disk device 1 accesses the magnetic disk 11 in response to the access command. Accessing includes writing data and reading data.

Data is written and read via a magnetic head 22. Specifically, in addition to the magnetic disk 11, the magnetic disk device 1 includes a spindle motor (SPM) 12, a ramp 13, an actuator arm 15, a voice coil motor (VCM) 16, a servo controller (SVC) 21, the magnetic head 22, a hard disk controller (HDC) 23, a preamplifier 24, a read/write channel (RWC) 25, a processor 26, sensors 27, a flash read only memory (FROM) 28, and a dynamic random access memory (DRAM) 29.

The SPM 12 rotates the magnetic disk 11 at a predetermined rotation speed. The SPM 12 and the magnetic disk 11 are coaxially attached.

The SVC 21 is an integrated circuit having a function as a driver that drives the SPM 12 and the VCM 16. The processor 26 controls the rotation of the SPM 12 and the rotation of the VCM 16 via the SVC 21.

The magnetic head 22 writes and reads information to and from the magnetic disk 11 by using a write head 22w and a read head 22r of the magnetic head 22. Furthermore, the magnetic head 22 is attached to a distal end of the actuator arm 15. The magnetic head 22 is moved in a radial direction of the magnetic disk 11 by the VCM 16 driven by the SVC 21. Note that a plurality of write heads 22w or read heads 22r or a plurality of both write heads 22w and read heads 22r, which are provided in the magnetic head 22, may be provided on a single magnetic head 22.

For example, when the rotation of the magnetic disk 11 has stopped, the magnetic head 22 is moved onto the ramp 13. The ramp 13 holds the magnetic head 22 at a position spaced apart from the magnetic disk 11.

The preamplifier 24 is an integrated circuit that writes and reads data via the magnetic head 22. The preamplifier 24 amplifies and outputs a signal read by the magnetic head 22 from the magnetic disk 11, and supplies the signal to the RWC 25 during read operation. Furthermore, the preamplifier 24 amplifies a signal corresponding to data to be written supplied from the RWC 25, and supplies the signal to the magnetic head 22 during write operation.

The HDC 23 controls transmission and reception of data to and from the host 2 via an I/F bus, and controls the DRAM 29, for example.

The DRAM 29 is used as a buffer for data transmitted to and received from the host 2. For example, the DRAM 29 is used for temporarily storing data to be written or data read from the magnetic disk 11.

Furthermore, the DRAM 29 is used as a memory for operation by the processor 26. The DRAM 29 is used as an area in which firmware is loaded and an area in which various types of management data are temporarily stored.

The RWC 25 modulates data to be written supplied from the HDC 23, and supplies the modulated data to the preamplifier 24. Furthermore, the RWC 25 performs demodulation including error correction on the signal read from the magnetic disk 11 and supplied from the preamplifier 24, and then outputs the signal to the HDC 23 as digital data.

The processor 26 is, for example, a central processing unit (CPU). The sensors 27, the flash read only memory (FROM) 28, and the DRAM 29 are connected to the processor 26.

The FROM 28 stores firmware (program data), various operation parameters, and the like. Note that the firmware may be stored in the magnetic disk 11.

The sensors 27 are sensor modules that detect environment information. The sensors 27 include, for example, an acceleration sensor module and a temperature sensor module. The acceleration sensor module is used for detecting vibration or impact applied to the magnetic disk device 1. The temperature sensor module is used for detecting the temperature of the magnetic disk device 1.

The processor 26 totally controls the magnetic disk device 1 in accordance with firmware stored in the FROM 28 or the magnetic disk 11. For example, the processor 26 loads firmware from the FROM 28 or the magnetic disk 11 to the DRAM 29, and controls the SVC 21, the preamplifier 24, the RWC 25, the HDC 23, and the like in accordance with the firmware loaded to the DRAM 29.

The HDC 23, the RWC 25, and the processor 26 are configured as a system-on-a-chip (SoC) 30, which is one integrated circuit. In addition to these components, the SoC 30 may include other elements (e.g., FROM 28 and DRAM 29).

Note that a part or all of the functions of the processor 26 may be implemented by a hardware circuit such as a field-programmable gate array (FPGA) and an application specific integrated circuit (ASIC).

Note that each of the SPM 12, the VCM 16, the SVC 21, the preamplifier 24, the sensors 27, the FROM 28, the DRAM 29, and the SoC 30 is one example of components of the embodiment. That is, the magnetic disk device 1 includes the magnetic disk 11, the magnetic head 22, and the component group that writes and reads data to and from the magnetic disk 11 by using the magnetic head 22.

Figure 2:
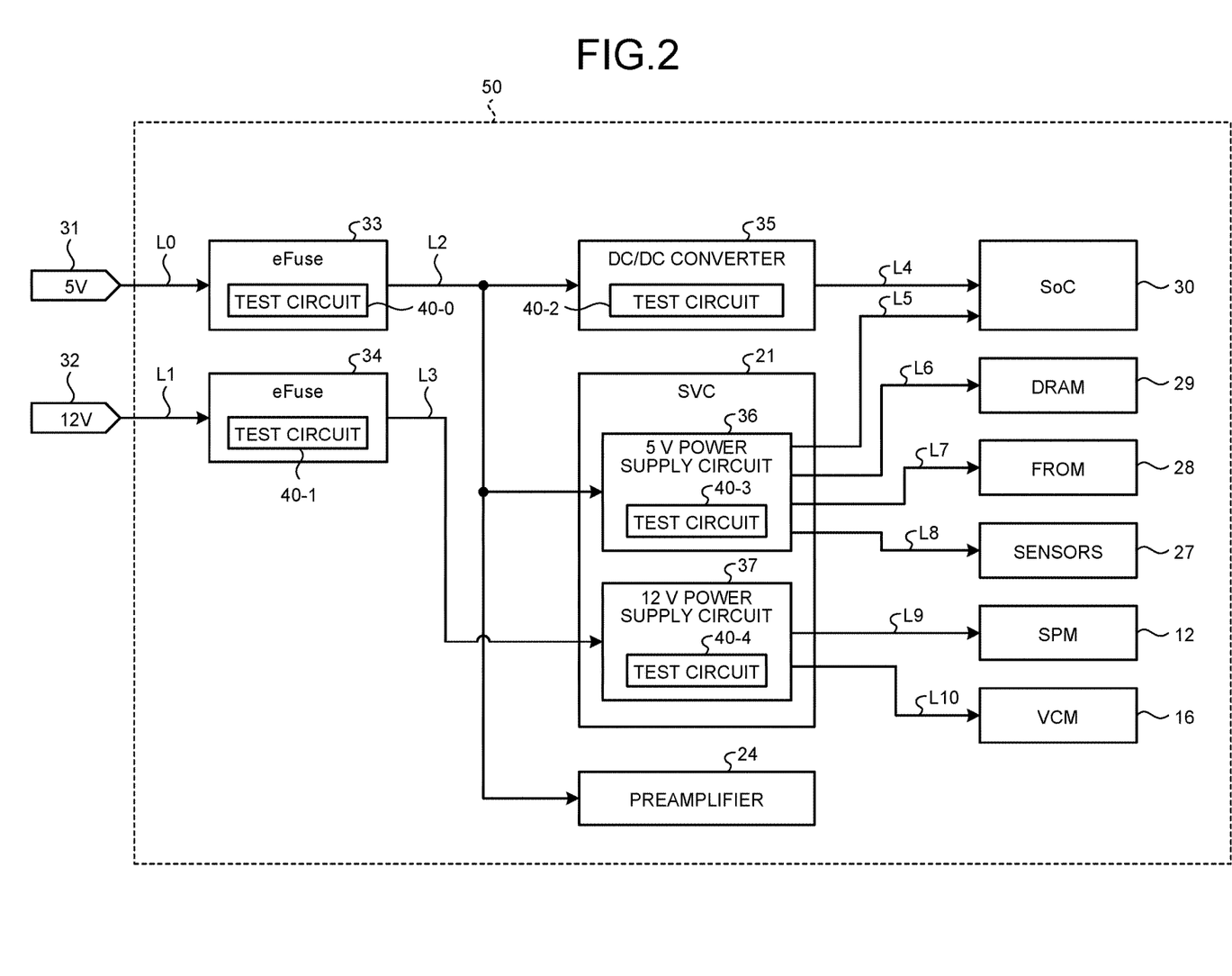
FIG. 2 is a schematic diagram illustrating one example of a power supply system in a component group of the embodiment.

FIG. 2 is a schematic diagram illustrating one example of a power supply system in the component group of the embodiment.

The magnetic disk device 1 includes a 5 V terminal 31 and a 12 V terminal 32. A component group 50 includes an eFuse 33, an eFuse 34, and a DC/DC converter 35 in addition to the components described with reference to FIG. 1.

The 5 V terminal 31 and the 12 V terminal 32 are provided in a housing of the magnetic disk device 1. Power of 5 V is input from the outside of the magnetic disk device 1 to the 5 V terminal 31. Power of 12 V is input from the outside of the magnetic disk device 1 to the 12 V terminal 32.

The power input to the 5 V terminal 31 is input to the eFuse 33 via a power line L0. The power input to the 12 V terminal 32 is input to the eFuse 34 via a power line L1.

The eFuse 33 and the eFuse 34 are integrated circuits having an overcurrent protection function for preventing an overcurrent from flowing through a power supply lane in which the eFuse 33 and the eFuse 34 themselves are interposed. The eFuse 33 and the eFuse 34 detect overcurrent, and block power at the time when the overcurrent is detected by using the overcurrent protection function.

The power of 5 V having passed through the eFuse 33 is input to the DC/DC converter 35, the SVC 21, and the preamplifier 24 via a power line L2. The power of 12 V having passed through the eFuse 34 is input to the SVC 21 via a power line L3.

The DC/DC converter 35 is an integrated circuit that converts a voltage of the power of 5 V input from the eFuse 33 and generates another piece of power. The power generated by the DC/DC converter 35 is input to the SoC 30 via a power line L4.

The SVC 21 includes a 5 V power supply circuit 36 and a 12 V power supply circuit 37.

The 5 V power supply circuit 36 generates power of various voltages based on the power of 5 V input from the eFuse 33. One of the plurality of pieces of power generated by the 5 V power supply circuit 36 is input to the SoC 30 via a power line L5. Another one of the plurality of pieces of power generated by the 5 V power supply circuit 36 is input to the DRAM 29 via a power line L6. Still another one of the plurality of pieces of power generated by the 5 V power supply circuit 36 is input to the FROM 28 via a power line L7. One of the plurality of pieces of remaining power generated by the 5 V power supply circuit 36 is input to the sensors 27 via a power line L8.

The 12 V power supply circuit 37 generates power for driving the SPM 12 and power for driving the VCM 16 based on the power of 12 V input from the eFuse 34. The power for driving the SPM 12 generated by the 12 V power supply circuit 37 is input to the SPM 12 via a power line L9. The power for driving the VCM 16 generated by the 12 V power supply circuit 37 is input to the VCM 16 via a power line L10.

In addition to the eFuse 33 and the eFuse 34, some components, for example, the DC/DC converter 35 or the SVC 21 may also have the overcurrent protection function. According to the overcurrent protection function of these integrated circuits including the eFuse 33 and the eFuse 34, overcurrent can be detected, and power can be blocked at the time when the overcurrent is detected.

Generally, in a magnetic disk device, current of several amperes may instantaneously flow depending on an operating environment or an operating mode. Thus, in the embodiment, the overcurrent protection function of these components is designed to permit current of several amperes to flow.

A component that receives power among some components in FIG. 2, however, is provided with a peripheral element such as a bypass capacitor. Even if such a peripheral element fails to be short-circuited, large current at a level at which detection can be made by the overcurrent protection function does not flow. Thus, the failure of the peripheral element cannot be detected by the overcurrent protection function.

Thus, in the embodiment, some of components for transmitting power are provided with a test circuit 40 for testing health of a peripheral element near a component on a downstream side. In the example in FIG. 2, a test circuit 40-0 is provided in the eFuse 33. A test circuit 40-1 is provided in the eFuse 34. A test circuit 40-2 is provided in the DC/DC converter 35. A test circuit 40-3 is provided in the 5 V power supply circuit 36 of the SVC 21. A test circuit 40-4 is provided in the 12 V power supply circuit 37 of the SVC 21.

Before transmitting power of a specified voltage to the component on the downstream side (i.e., operating voltage of component on downstream side), each test circuit 40 outputs a voltage lower than a specified voltage (referred to as minute voltage) that does not destroy a peripheral element provided near the component on the downstream side. Each test circuit 40 tests the health of the peripheral element provided near the component on the downstream side based on a value of current flowing through a power line in accordance with output of the minute voltage.

Hereinafter, inputting power of a voltage of X volts (where X is positive real number) to a component may be referred to as supplying a voltage of X volts to the component.

Figure 3:
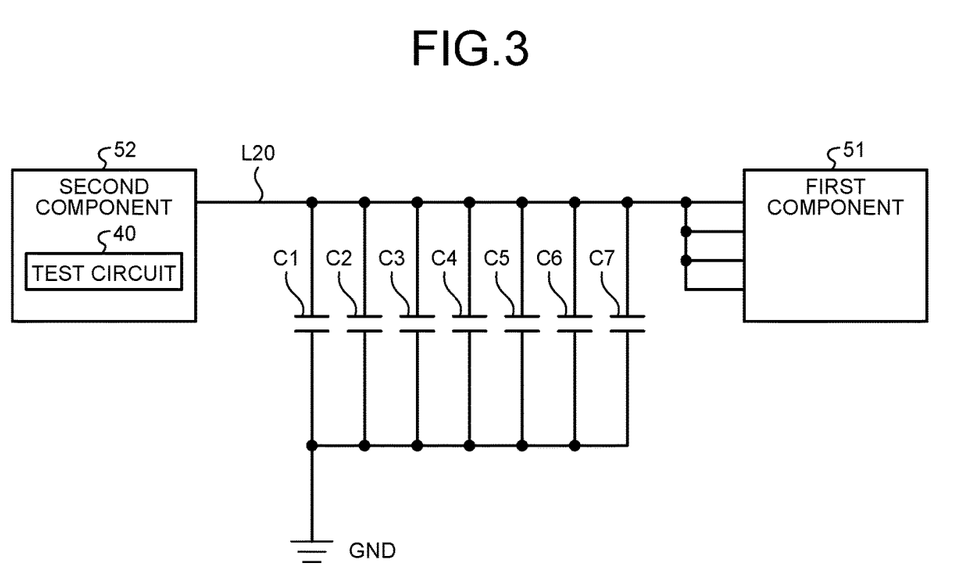
FIG. 3 is a schematic diagram illustrating one example of peripheral elements of the embodiment.

FIG. 3 is a schematic diagram illustrating one example of peripheral elements of the embodiment.

In FIG. 3, a first component 51 is connected to a second component 52 via a power line L20. The second component 52 sends power to the first component 51 via the power line L20. That is, the second component 52 is a component that transmits power in the component group 50, and the first component 51 is a component that receives power in the component group 50. The second component 52 is provided with the test circuit 40.

For example, when focusing on a pair of the eFuse 33 and the DC/DC converter 35 in the component group 50 in FIG. 2, the DC/DC converter 35 corresponds to the first component 51, the eFuse 33 corresponds to the second component 52, and the power line L2 corresponds to the power line L20. When focusing on a pair of the eFuse 33 and the SVC 21, the SVC 21 corresponds to the first component 51, the eFuse 33 corresponds to the second component 52, and the power line L2 corresponds to the power line L20. When focusing on a pair of the eFuse 33 and the preamplifier 24, the preamplifier 24 corresponds to the first component 51, the eFuse 33 corresponds to the second component 52, and the power line L2 corresponds to the power line L20. When focusing on a pair of the eFuse 34 and the SVC 21, the SVC 21 corresponds to the first component 51, the eFuse 34 corresponds to the second component 52, and the power line L3 corresponds to the power line L20. When focusing on a pair of the DC/DC converter 35 and the SoC 30, the SoC 30 corresponds to the first component 51, the DC/DC converter 35 corresponds to the second component 52, and the power line L4 corresponds to the power line L20. When focusing on a pair of the SVC 21 and the SoC 30, the SoC 30 corresponds to the first component 51, the SVC 21 corresponds to the second component 52, and the power line L5 corresponds to the power line L20. When focusing on a pair of the SVC 21 and the DRAM 29, the DRAM 29 corresponds to the first component 51, the SVC 21 corresponds to the second component 52, and the power line L6 corresponds to the power line L20. When focusing on a pair of the SVC 21 and the FROM 28, the FROM 28 corresponds to the first component 51, the SVC 21 corresponds to the second component 52, and the power line L7 corresponds to the power line L20. When focusing on a pair of the SVC 21 and the sensors 27, the sensors 27 correspond to the first component 51, the SVC 21 corresponds to the second component 52, and the power line L8 corresponds to the power line L20. When focusing on a pair of the SVC 21 and the SPM 12, the SPM 12 corresponds to the first component 51, the SVC 21 corresponds to the second component 52, and the power line L9 corresponds to the power line L20. When focusing on a pair of the SVC 21 and the VCM 16, the VCM 16 corresponds to the first component 51, the SVC 21 corresponds to the second component 52, and the power line L10 corresponds to the power line L20.

In the example in FIG. 3, in one example of the peripheral elements near the first component 51, seven bypass capacitors C1 to C7 are provided in the power line L20. Note that not only seven but another number of bypass capacitors may be provided in the power line L20.

Each of the bypass capacitors C1 to C7 provided in the power line L20 as a peripheral element may be short-circuited due to failure. In a case where any one of the bypass capacitors C1 to C7 is short-circuited, a larger amount of current flows when a minute voltage is applied to the power line L20 by the test circuit 40 than in a case where any one of the bypass capacitors C1 to C7 is not short-circuited. The test circuit 40 measures a value of the current flowing through the power line L20 in response to the applied minute voltage, and determines the health of the bypass capacitors C1 to C7 based on a comparison between a measured current value and a threshold (first threshold or second threshold) previously stored in an internal nonvolatile memory (nonvolatile memory 49 to be described later).

Note that the bypass capacitors (bypass capacitors C1 to C7 in example of FIG. 3) are examples of peripheral elements to be tested for health by the test circuit 40 of the embodiment. The peripheral elements to be detected for failure by the test circuit 40 of the embodiment are not limited to the bypass capacitors. For example, a resistor or a coil for setting the operation of the first component 51 may be provided near the first component 51. The resistor or the coil may be to be tested for health by the test circuit 40 of the embodiment.

Figure 4:
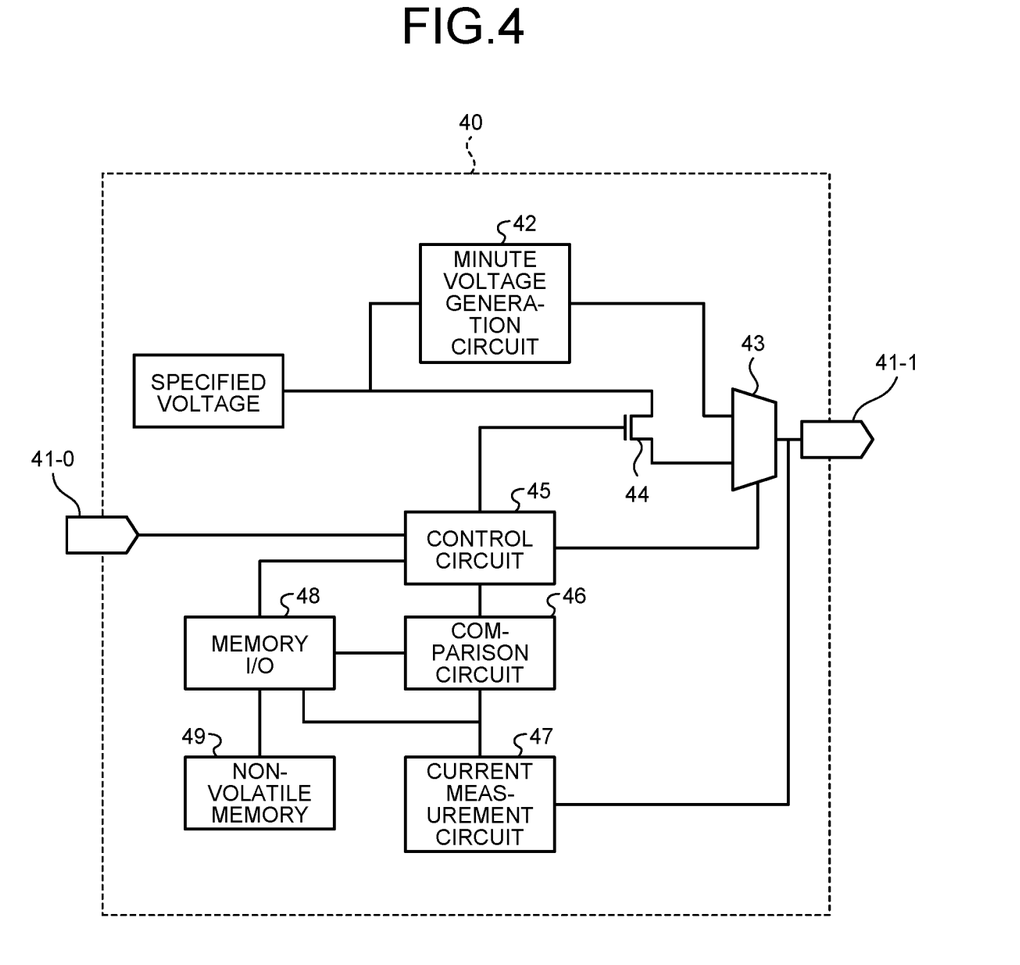
FIG. 4 is a schematic diagram illustrating one example of a configuration of a test circuit of the embodiment.

FIG. 4 is a schematic diagram illustrating one example of a configuration of the test circuit 40 of the embodiment. Note that, in the description of FIG. 4, a component including the illustrated test circuit 40 is simply referred to as the second component 52.

The test circuit 40 includes a first terminal 41-0, a second terminal 41-1, a minute voltage generation circuit 42, a selector 43, a switch 44, a control circuit 45, a comparison circuit 46, a current measurement circuit 47, a memory input/output circuit (memory I/O) 48, and the nonvolatile memory 49.

A current measurement command can be input from the SoC 30 to the first terminal 41-0. The current measurement command input to the first terminal 41-0 is sent to the control circuit 45. The current measurement command will be described later.

The second terminal 41-1 is connected to a component on the downstream side via a power line.

The minute voltage generation circuit 42 generates a minute voltage based on a specified voltage supplied to the downstream side (i.e., operating voltage of component on downstream side). Note that the minute voltage generation circuit 42 may generate a minute voltage based on a specified voltage supplied from the upstream side (i.e., operating voltage of second component 52).

The selector 43 includes two input terminals. The minute voltage generated by the minute voltage generation circuit 42 is input to one of the two input terminals of the selector 43. A specified voltage is input to the other one of the two input terminals of the selector 43 via the switch 44. An output terminal of the selector 43 is connected to the second terminal 41-1.

The voltage selected by the selector 43 is supplied to a component on the downstream side via the second terminal 41-1 and a power line.

The control circuit 45 controls the operation of the test circuit 40 including the operation of the selector 43 and the operation of the switch 44.

The current measurement circuit 47 measures a value of current flowing through a power line connected to the second terminal 41-1.

The memory I/O 48 inputs and outputs data to and from the nonvolatile memory 49.

The nonvolatile memory 49 stores a threshold. Any type of nonvolatile memory 49 may be used. For example, a one time programmable (OTP) memory or an electrically erasable programmable read-only memory (EEPROM) can be applied as the nonvolatile memory 49.

Here, in one example, two thresholds (first threshold and second threshold) are written to the nonvolatile memory 49. The first threshold is set for determining whether or not a peripheral element has failed. The second threshold is set for detecting a sign of failure of a peripheral element.

When a capacitor deteriorates toward short circuit failure, current flowing through the capacitor may gradually increase with time until the capacitor leads to the short circuit failure. When the peripheral element includes the capacitor, a sign of failure of the peripheral element can be detected by setting a value slightly smaller than the first threshold as the second threshold and comparing a value of current flowing through a power line connected to the second terminal 41-1 with the second threshold.

That is, in the embodiment, in addition to whether or not the peripheral element has failed, the test circuit 40 determines whether or not the peripheral element is about to fail in the near future.

A method of acquiring the first threshold and the second threshold is not limited to a specific method. For example, a value equal to or larger than a value of current flowing in accordance with the specified voltage at the time when the peripheral element does not fail is used as the first threshold. A value smaller than the first threshold is used as the second threshold.

Note that a value of current flowing in accordance with a minute voltage at the time when the peripheral element does not fail is at least smaller than a value of current flowing in accordance with the specified voltage. The fact that the value of current flowing in accordance with a minute voltage is larger than the value of current flowing in accordance with the specified voltage at the time when the peripheral element does not fail indicates a possibility that the peripheral element is not functioning normally. Thus, here, in one example, a value of current flowing in accordance with the specified voltage is set as the first threshold.

Note that not only two but another number of thresholds may be used by the test circuit 40. Only one of the first threshold and the second threshold may be written in the nonvolatile memory 49, and only one of failure of a peripheral element and a sign of failure of the peripheral element may be detected. Furthermore, three or more thresholds may be written in the nonvolatile memory 49. Any state detection may be additionally performed in addition to the detection of failure of the peripheral element and the detection of a sign of failure of the peripheral element. Furthermore, the second threshold is not required to be stored in the nonvolatile memory 49, and may be calculated in the control circuit 45 each time of use based on the first threshold.

When any of the test circuits 40 detects failure of the peripheral element, the magnetic disk device 1 stops activation. When any of the test circuits 40 detects the sign of failure of the peripheral element, the magnetic disk device 1 starts an operation in a read-only mode, and notifies the host 2 that there is a sign of failure. In one example, the host 2 is notified that there is a sign of failure by a function of reporting to the host in a SMART function. A method of giving notification that there is a sign of failure is not limited to the method using the function of reporting to the host in the SMART function.

In the read-only mode, reading data from the magnetic disk device 1 is permitted while writing data to the magnetic disk device 1 is prohibited. In a full access mode, both reading data from the magnetic disk device 1 and writing data to the magnetic disk device 1 are permitted.

Next, the operation of the magnetic disk device 1 of the embodiment will be described.

Two threshold are written to the nonvolatile memory 49 of each test circuit 40 in inspection before shipment of the magnetic disk device 1.

More specifically, a manufacturer connects the assembled magnetic disk device 1 to an inspection device, and activates the magnetic disk device 1. In the magnetic disk device 1, the processor 26 of the SoC 30 inspects the magnetic disk device 1 based on a firmware program for inspection. Two thresholds are written to the nonvolatile memory 49 of each test circuit 40 as a part of operation of the inspection of the magnetic disk device 1 based on the firmware program for inspection.

Figure 5:
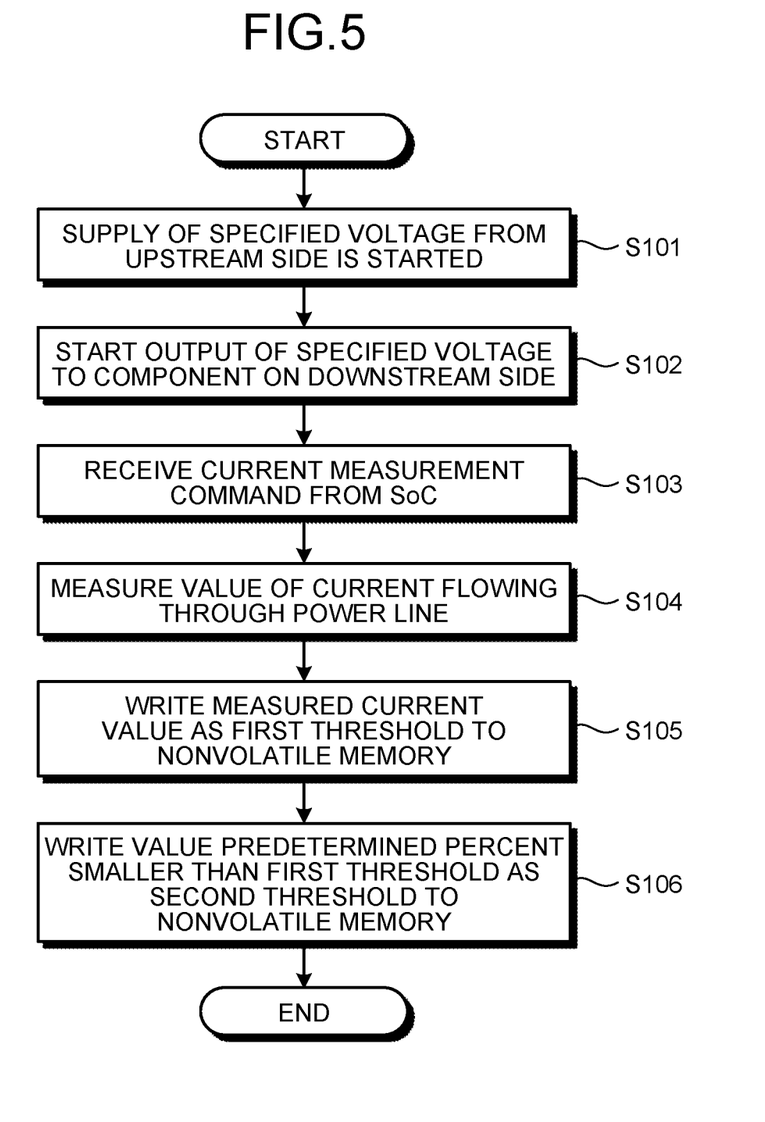
FIG. 5 is a flowchart illustrating one example of an operation of writing two thresholds to a nonvolatile memory provided in the test circuit of the embodiment.

FIG. 5 is a flowchart illustrating one example of an operation of writing two thresholds to the nonvolatile memory 49 provided in the test circuit 40 of the embodiment. In the description of the figure, the test circuit 40 of interest is referred to as a target test circuit 40.

When supply of a specified voltage (i.e., operating voltage of component including target test circuit 40) from the upstream side is started (S101), the test circuit 40 starts output of a specified voltage (i.e., operating voltage of component on downstream side) to the component on the downstream side (S102).

In S102, the control circuit 45 attempts to read a threshold from the nonvolatile memory 49. Since the threshold has not yet been written in the nonvolatile memory 49, the control circuit 45 fails to read the threshold. The control circuit 45 turns on the switch 44 and operates the selector 43 in accordance with the failure of reading the threshold to output a specified voltage from the second terminal 41-1 to the component on the downstream side.

Subsequently, the control circuit 45 receives a current measurement command from the SoC 30 via the first terminal 41-0 (S103). In response to the current measurement command, the control circuit 45 measures a value of current flowing through the second terminal 41-1 by using the current measurement circuit 47 (S104). The current measurement circuit 47 writes the measured current value as the first threshold to the nonvolatile memory 49 (S105).

The control circuit 45 writes a value a predetermined percent smaller than the first threshold as the second threshold to the nonvolatile memory 49 (S106). Then, the operation of the target test circuit 40 writing the two thresholds to the nonvolatile memory 49 ends.

Each of the other test circuits 40 individually executes the same operation as the operation of the target test circuit 40 in FIG. 5. Thus, the first threshold and the second threshold written to the nonvolatile memory 49 of each test circuit 40 may be different for each test circuit 40.

Note that, in the example in FIG. 5, a value of current flowing at the time when the test circuit 40 outputs the specified voltage is set as the first threshold, and a value a predetermined percent smaller than the first threshold is set as the second threshold. A method of acquiring the first threshold and the second threshold is not limited thereto.

For example, the control circuit 45 may acquire, as the first threshold, a value obtained by a linear sum of the current value measured by the processing of S104 and the variation of the current value. Furthermore, the control circuit 45 may acquire a value obtained by subtracting a fixed value from the first threshold as the second threshold.

After the first threshold and the second threshold are written to the nonvolatile memory 49, health of a peripheral element is tested in each test circuit 40 when the magnetic disk device 1 is activated again.

Figure 6:
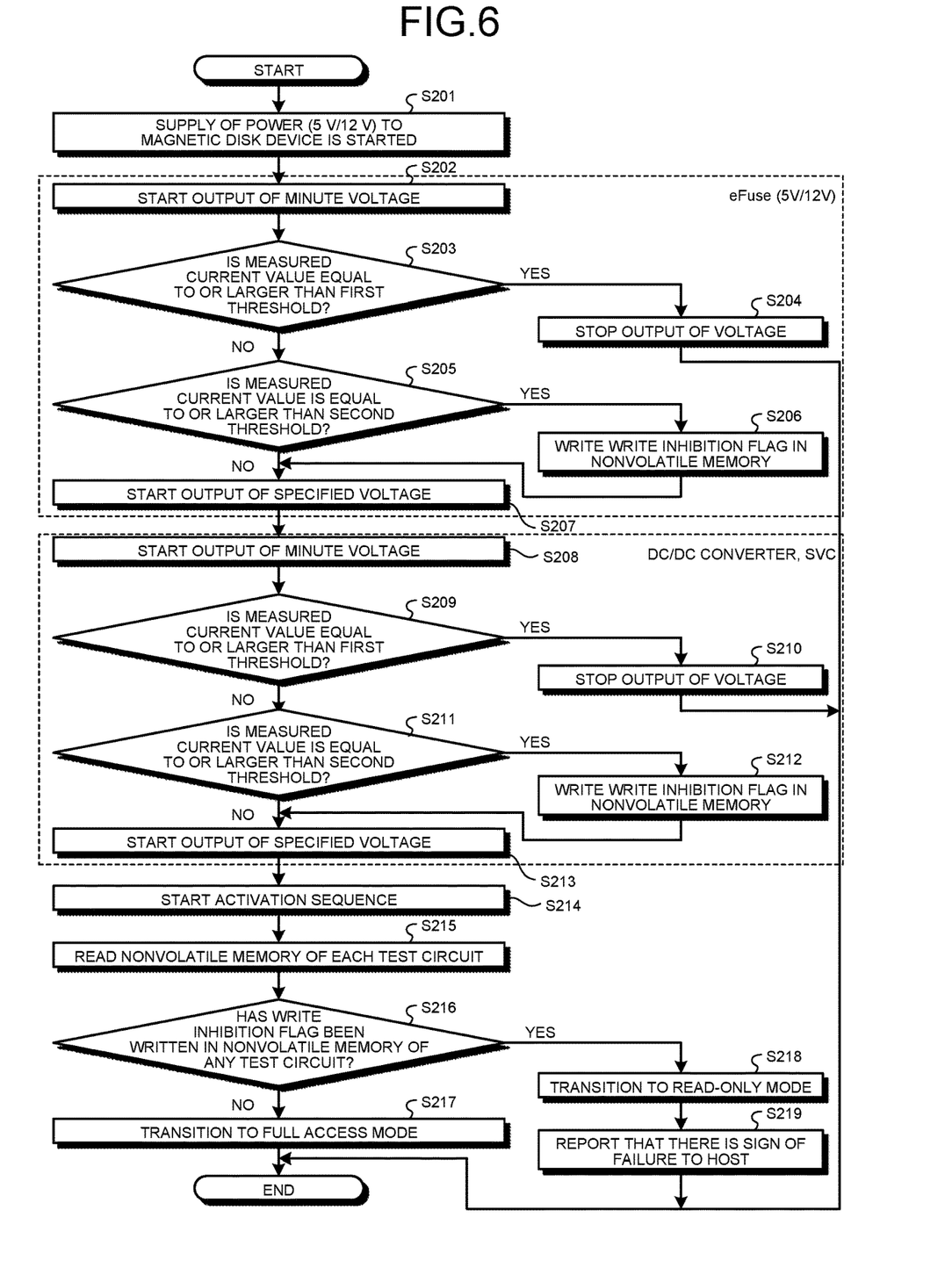
FIG. 6 is a flowchart illustrating one example of an operation at the time when the magnetic disk device of the embodiment is activated.

FIG. 6 is a flowchart illustrating one example of the operation at the time when the magnetic disk device 1 of the embodiment is activated.

First, when supply of power of 5 V and power of 12 V to the magnetic disk device 1 is started by a power-on operation of a user (S201), in the eFuse 33 connected to the 5 V terminal 31 and the eFuse 34 connected to the 12 V terminal 32, each of the test circuit 40-0 of the eFuse 33 and the test circuit 40-1 of the eFuse 34 starts output of a minute voltage by the control circuit 45 operating the selector 43 (S202).

From S202 to S207, the test circuit 40-0 and the test circuit 40-1 execute a common operation. Thus, regarding the processing from S202 to S207, the operation of one test circuit 40 serving as a representative of the test circuit 40-0 and the test circuit 40-1 will be described.

Subsequent to S202, in the test circuit 40, the current measurement circuit 47 starts measuring a value of current flowing from the second terminal 41-1 to a component on the downstream side. The comparison circuit 46 determines whether or not the measured current value is equal to or larger than the first threshold written in the nonvolatile memory 49 (S203).

When the measured current value is equal to or larger than the first threshold (S203: Yes), a peripheral element provided near the component on the downstream side is estimated to have failed. Therefore, the control circuit 45 selects an input terminal to which the specified voltage is input by operating the selector 43 and turns off the switch 44 to stop the output of the voltage from the second terminal 41-1 (S204). Since the supply of the voltage to the component on the downstream side is blocked by the processing of S204, the activation operation is stopped in the magnetic disk device 1.

When the measured current value is not equal to or larger than the first threshold (S203: No), the comparison circuit 46 determines whether or not the measured current value is equal to or larger than the second threshold written in the nonvolatile memory 49 (S205).

When the measured current value is equal to or larger than the second threshold (S205: Yes), the comparison circuit 46 writes a write inhibition flag in the nonvolatile memory 49 (S206). Then, the control circuit 45 selects an input terminal to which the specified voltage is input by operating the selector 43 and turns on the switch 44 to start the output of the specified voltage from the second terminal 41-1 (S207).

When the measured current value is not equal to or larger than the second threshold (S205: No), the processing of S206 is skipped, and the control proceeds to S207.

When the processing of S207 is executed in each of the test circuit 40-0 and the test circuit 40-1, supply of power of a specified voltage (here, 5 V) to the DC/DC converter 35, the SVC 21, and the preamplifier 24, which are components on the downstream side of the eFuse 33 and supply of power of a specified voltage (here, 12 V) to the SVC 21, which is a component on the downstream side of the eFuse 34 start.

In each of the test circuit 40-2 of the DC/DC converter 35, the test circuit 40-3 of the SVC 21, and the test circuit 40-4 of the SVC 21, the control circuit 45 operates a selection signal of the selector 43 in response to the start of the supply of power of a specified voltage to start the output of a minute voltage (S208).

From S208 to S213, the test circuit 40-2, the test circuit 40-3, and the test circuit 40-4 execute a common operation. Specifically, in S208 to S213, each of the test circuit 40-2, the test circuit 40-3, and the test circuit 40-4 executes processing similar to the processing from S202 to S207.

When output of the specified voltage is started in each of the test circuit 40-2, the test circuit 40-3, and the test circuit 40-4 (S213), all the components in FIG. 2, that is, the eFuse 33, the eFuse 34, the DC/DC converter 35, the SVC 21, the preamplifier 24, the DRAM 29, the FROM 28, the sensors 27, the SPM 12, the VCM 16, and the SoC 30 are put into a state in which the specified voltage has been supplied or a state in which the specified voltage can be supplied. Thus, the SoC 30 starts an activation sequence (S214).

In the activation sequence, the SoC 30 reads the nonvolatile memory 49 of each test circuit 40 (S215), and determines whether or not the write inhibition flag has been written in the nonvolatile memory 49 of any test circuit 40 (S216).

When there is no test circuit 40 including the nonvolatile memory 49 in which the write inhibition flag is written (S216: No), the SoC 30 transitions to the full access mode (S217), and the operation at the time of activation of the magnetic disk device 1 ends.

When the write inhibition flag is written in the nonvolatile memory 49 of any test circuit 40 (S216: Yes), the SoC 30 transitions to the read-only mode (S218). Then, the SoC 30 reports that there is a sign of failure to the host 2 by a function of reporting to the host in the SMART function, for example (S219), and the operation at the time of activation of the magnetic disk device 1 ends.

When recognizing that there is a sign of failure via the host 2, the user can prepare another healthy storage device (e.g., magnetic disk device, solid state drive (SSD), and tape drive) and migrate data from the magnetic disk device 1 in the read-only mode to the healthy storage device.

Note that, in the description of FIG. 6, in the processing of comparing the measured current value with the threshold (specifically, S203, S205, S209, and S211), when the measured current value is equal to the threshold, the same operation as that in the case where the measured current value is larger than the threshold is executed. The processing in the case where the measured current value is equal to the threshold is not limited thereto. When the measured current value is equal to the threshold, the same operation as that in the case where the measured current value is smaller than the threshold may be executed.

As described above, according to the embodiment, the component group 50 of the magnetic disk device 1 includes the first component 51 and the second component 52. The first component 51 receives power. The second component 52 sends power to the first component 51, and includes the test circuit 40. The second component 52 is connected by the power line L20 for sending power to the first component 51. When supply of the specified voltage of the second component 52 is started, the second component 52 outputs a minute voltage, which is a voltage having a value smaller than the specified voltage of the first component 51, to the power line L20, and measures a value of current flowing through the power line L20 in accordance with the output of the minute voltage. When the measured current value is smaller than the first threshold, the second component 52 starts the output of the specified voltage of the first component 51 to the power line L20. When the measured current value is larger than the first threshold, the second component 52 stops the output of a voltage to the power line L20.

Thus, the magnetic disk device 1 automatically stops the operation when the peripheral element has failed. That is, health of a peripheral element provided near a component can be tested.

Note that, according to the embodiment, a peripheral element is connected to the first component 51. The first threshold is equal to or larger than a value of current flowing through the power line L20 in accordance with the output of the specified voltage from the second component 52 at the time when the peripheral element has not failed.

Thus, the magnetic disk device 1 can be activated when the peripheral element has not failed, and stops the operation when the peripheral element has failed.

Furthermore, according to the embodiment, the test circuit 40 includes the nonvolatile memory 49. When the first threshold is not written in the nonvolatile memory 49, the test circuit 40 outputs the specified voltage of the first component 51 to the power line L20, and acquires the first threshold based on a value of current flowing through the power line L20 in accordance with the output of the specified voltage of the first component 51. Then, the test circuit 40 writes the first threshold to the nonvolatile memory 49. Then, the test circuit 40 uses the first threshold written in the nonvolatile memory 49.

Since the first threshold is automatically determined based on a value of current actually flowing through a power line in accordance with the output of the specified voltage, the manufacturer is relieved of a burden of individually setting the first threshold for each test circuit 40.

Note that, in the example of the embodiment, each of the eFuse 33, the eFuse 34, the DC/DC converter 35, and the SVC 21 corresponds to the second component 52. The component corresponding to the second component 52 is not limited thereto. Furthermore, any number of components corresponding to the second component 52 may be provided as long as one or more of the components are provided.

According to the embodiment, one or more components corresponding to the second component 52 are included. After all the one or more components corresponding to the second component 52 start the output of the specified voltage of a component on the downstream side, the magnetic disk device 1 transitions to a mode in which access from the host 2 is allowed. The mode in which access from the host 2 is allowed includes, for example, the full access mode and the read-only mode.

That is, when all the test circuits 40 determine that no peripheral element has failed, the magnetic disk device 1 transitions to the mode in which access from the host 2 is allowed.

Furthermore, according to the embodiment, when the measured current value is larger than the second threshold, the second component 52 writes the write inhibition flag to the nonvolatile memory 49. Note that the write inhibition flag is one example of first information. When the write inhibition flag is written in the nonvolatile memory 49 in at least one of one or more components corresponding to the second component 52, the magnetic disk device 1 transitions to the read-only mode. When the write inhibition flag is not written in the nonvolatile memory 49 in any of the one or more components corresponding to the second component 52, the magnetic disk device 1 transitions to the full access mode.

Thus, the user can migrate data in the magnetic disk device 1 to another magnetic disk device before the peripheral element fails.

Furthermore, according to the embodiment, when the write inhibition flag is written in the nonvolatile memory 49 in at least one of one or more components corresponding to the second component 52, the magnetic disk device 1 notifies the host 2 that there is a sign of failure. The sign of failure is one example of second information. A transition to the read-only mode is made. When the write inhibition flag is not written in the nonvolatile memory 49 in any of the one or more components corresponding to the second component 52, the magnetic disk device 1 does not notify the host 2 that there is a sign of failure.

Thus, the user can migrate data in the magnetic disk device 1 to another magnetic disk device.

Note that the magnetic disk device 1 may execute only one of the transition to the read-only mode and the notification to the host 2 that there is a sign of failure when the write inhibition flag is written in the nonvolatile memory 49 in at least one of one or more components corresponding to the second component 52.

Note that the comparison circuit 46 has been described above as writing the write inhibition flag to the nonvolatile memory 49. A method of holding the write inhibition flag is not limited to the method using the nonvolatile memory 49. For example, the control circuit 45 may include a register, and the comparison circuit 46 may store the write inhibition flag in the register.

Furthermore, according to the embodiment, the magnetic disk device 1 can execute different operations depending on whether the current value measured in accordance with the output of a minute voltage to the power line is smaller or larger than the threshold (first threshold or second threshold).

In one example, when a current value measured by outputting a minute voltage in the second component 52 is smaller than the first threshold, the magnetic disk device 1 transitions to a mode in which access from the host 2 is allowed (specifically, full access mode or read-only mode). When the current value measured by outputting a minute voltage in the second component 52 is larger than the first threshold, the magnetic disk device 1 stops activation.

In another example, when the current value measured by outputting a minute voltage in the second component 52 is smaller than the second threshold, the magnetic disk device 1 transitions to the full access mode. When the current value measured by outputting a minute voltage in the second component 52 is larger than the second threshold, the magnetic disk device 1 transitions to the read-only mode.

In still another example, when the current value measured by outputting a minute voltage in the second component 52 is smaller than the second threshold, the magnetic disk device 1 transitions to a mode in which access from the host 2 is allowed without notifying the host 2 that there is a sign of failure. When the current value measured by outputting a minute voltage in the second component 52 is larger than the second threshold, the magnetic disk device 1 notifies the host 2 that there is a sign of failure, and transitions to a mode in which access from the host 2 is allowed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head; and
   a component group that writes and reads data to and from the magnetic disk by using the magnetic head,
   wherein the component group includes:

a first component that operates at a voltage of a first value; and a second component that is connected to the first component by a power line which sends power to the first component, operates at a voltage of a second value, when supply of the voltage of the second value to the second component is started, outputs a voltage of a third value smaller than the first value to the power line, measures a fourth value which is a value of current flowing through the power line in accordance with output of the voltage of the third value, when the fourth value is smaller than a first threshold, starts output of the voltage of the first value to the power line, and when the fourth value is larger than the first threshold, stops output of a voltage to the power line.

2. The magnetic disk device according to claim 1, wherein a peripheral element is connected to the first component, and the first threshold is a value equal to or larger than a value of current flowing through the power line in accordance with output of the voltage of the first value from the second component in a case where the peripheral element has not failed.

3. The magnetic disk device according to claim 2, wherein the component group includes one or more pairs of a third component and a fourth component, the third component corresponding to the first component, the fourth component performing, on the third component, an operation of the second component, and the magnetic disk device is connected to a host, and transitions, after all fourth components included in the one or more pairs start output of the voltage of the first value, to a mode in which access from the host is allowed.

4. The magnetic disk device according to claim 1, wherein the second component includes a nonvolatile memory, when the first threshold is not written in the nonvolatile memory, outputs the voltage of the first value to the power line, measures a fifth value which is a value of current flowing through the power line in accordance with output of the voltage of the first value, acquires the first threshold based on the fifth value, writes the first threshold to the nonvolatile memory, and uses the first threshold written in the nonvolatile memory for comparison with the fourth value.

5. The magnetic disk device according to claim 4, wherein the component group includes one or more pairs of a third component and a fourth component, the third component corresponding to the first component, the fourth component performing, on the third component, an operation of the second component, and the magnetic disk device is connected to a host, and transitions, after all fourth components included in the one or more pairs start output of the voltage of the first value, to a mode in which access from the host is allowed.

6. The magnetic disk device according to claim 1, wherein the second component is an electronic fuse, a servo controller, or a DC/DC converter.

7. The magnetic disk device according to claim 6, wherein the component group includes one or more pairs of a third component and a fourth component, the third component corresponding to the first component, the fourth component performing, on the third component, an operation of the second component, and the magnetic disk device is connected to a host, and transitions, after all fourth components included in the one or more pairs start output of the voltage of the first value, to a mode in which access from the host is allowed.

8. The magnetic disk device according to claim 1, wherein the component group includes one or more pairs of a third component and a fourth component, the third component corresponding to the first component, the fourth component performing, on the third component, an operation of the second component, and the magnetic disk device is connected to a host, and transitions, after all fourth components included in the one or more pairs start output of the voltage of the first value, to a mode in which access from the host is allowed.

9. The magnetic disk device according to claim 8, wherein the second component includes a nonvolatile memory, and, when the fourth value is smaller than the first threshold and the fourth value is larger than a second threshold, writes first information to the nonvolatile memory, when all fourth components included in the one or more pairs start output of the voltage of the first value and the first information is written in the nonvolatile memory of a fourth component included in at least one of the one or more pairs, the magnetic disk device transitions to a read-only mode, and when all fourth components included in the one or more pairs start output of the voltage of the first value and the first information is not written in the nonvolatile memory in any of the one or more third components, the magnetic disk device transitions to a full access mode.

10. The magnetic disk device according to claim 8, wherein the second component includes a nonvolatile memory, and, when the fourth value is smaller than the first threshold and the fourth value is larger than a second threshold, writes first information to the nonvolatile memory, when all fourth components included in the one or more pairs start output of the voltage of the first value and the first information is written in the nonvolatile memory of a fourth component included in at least one of the one or more pairs, the magnetic disk device notifies the host of second information, and when all fourth components included in the one or more pairs start output of the voltage of the first value and the first information is not written in the nonvolatile memory in any of the one or more third components, the magnetic disk device does not notify the host of the second information.

11. A magnetic disk device comprising:

a magnetic disk;

a magnetic head; and a component group that writes and reads data to and from the magnetic disk by using the magnetic head, wherein the component group includes:

a first component that operates at a voltage of a first value; and a second component that is connected to the first component by a power line which sends power to the first component, operates at a voltage of a second value, when supply of the voltage of the second value to the second component is started, outputs a voltage of a third value smaller than the first value to the power line, measures a fourth value which is a value of current flowing through the power line in accordance with output of the voltage of the third value, and starts output of the voltage of the first value to the power line after measurement of the fourth value, when the fourth value is smaller than a threshold, executes a first operation, and when the fourth value is larger than the threshold, executes a second operation different from the first operation.

12. The magnetic disk device according to claim 11, wherein the first operation includes transitioning to a mode in which access from a host is allowed, and the second operation includes stopping activation.

13. The magnetic disk device according to claim 11, wherein the first operation includes transitioning to a full access mode, and the second operation includes transitioning to a read-only mode.

14. The magnetic disk device according to claim 11, wherein the magnetic disk device is connected to a host, the first operation includes transitioning, without notifying the host of first information, to a mode in which access from the host is allowed, and the second operation includes notifying the host of the first information and transitioning to a mode in which access from the host is allowed.

15. The magnetic disk device according to claim 11, wherein the second component is an electronic fuse, a servo controller, or a DC/DC converter.

16. A method of controlling a magnetic disk device including a component group, the component group including a first component being connected to a power line, the first component operating by power of a voltage of a first value input via the power line, the method comprising:

outputting a voltage of a second value smaller than the first value to the power line;

measuring a third value which is a value of current flowing through the power line in accordance with output of a voltage of the second value; and executing a first operation when the third value is smaller than a threshold, and executing a second operation different from the first operation when the third value is larger than the threshold, wherein the magnetic disk device is connected to a host, the first operation includes transitioning, without notifying the host of first information, to a mode in which access from the host is allowed, and the second operation includes notifying the host of the first information and transitioning to a mode in which access from the host is allowed, wherein the component group includes a second component, the second component is an electronic fuse, a servo controller, or a DC/DC converter, and the second component performs:
the outputting the voltage of the second value;
the measuring the third value; and
the executing the first operation when the third value is smaller than the threshold, and the executing the second operation when the third value is larger than the threshold.

* * * * *